March 1, 1960  J. SIVERTSEN  2,927,289
INDUCTANCE STRAIN GAUGES
Filed July 21, 1955
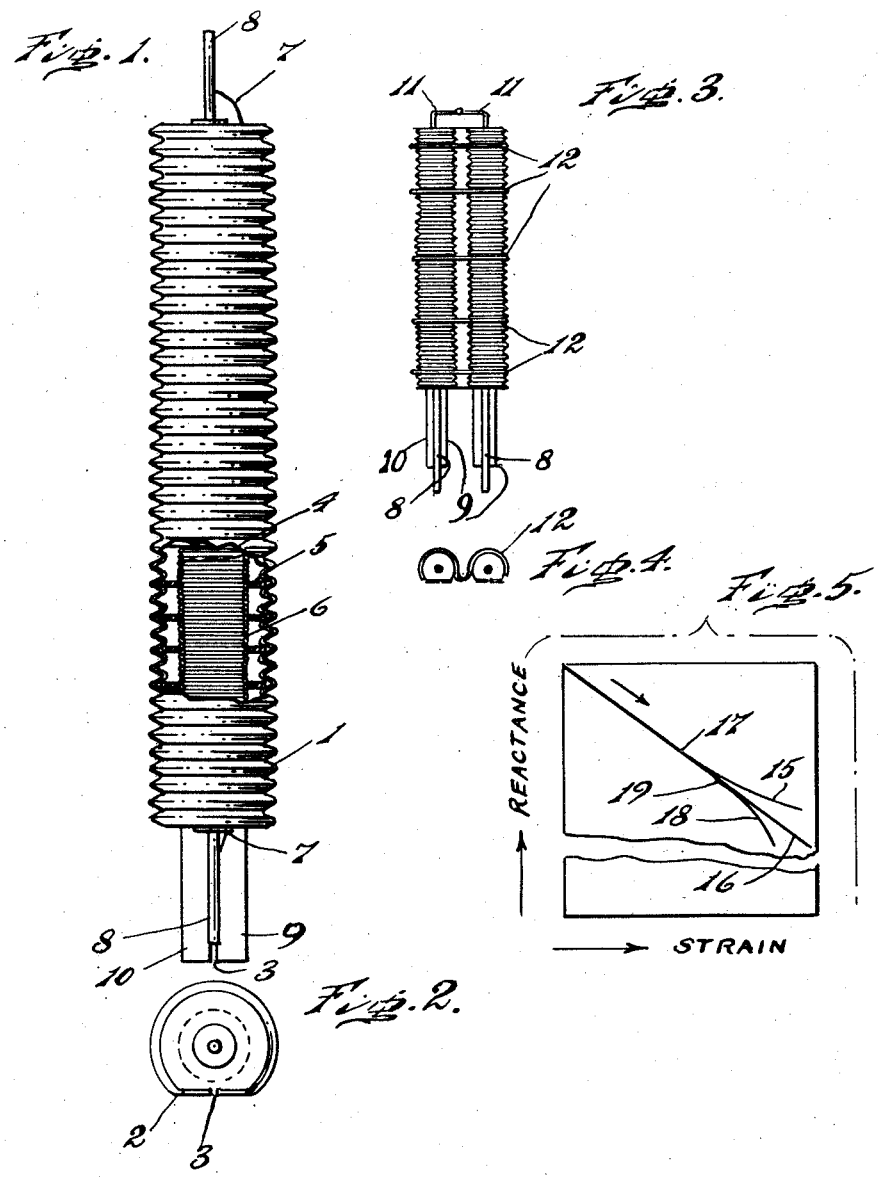
INVENTOR
Jens Sivertsen
BY
Herbert S. Fairbanks
ATTORNEY

United States Patent Office 2,927,289
Patented Mar. 1, 1960

2,927,289

INDUCTANCE STRAIN GAUGES

Jens Sivertsen, Philadelphia, Pa.

Application July 21, 1955, Serial No. 523,420

3 Claims. (Cl. 336—20)

This invention relates to strain gauges and particularly to the type that uses inductance or reactance as a function of the strain in a specimen to be tested.

The invention shows a variation from my pending application Serial No. 414,318 as will hereinafter appear.

My invention comprehends a novel inductance strain gauge.

For the purpose of illustrating the invention, I have shown in the accompanying drawings preferred embodiments of it which in practice will give satisfactory and reliable results. It is, however, to be understood that the various instrumentalities of which the invention consists can be variously arranged and organized, and the invention is not limited, except by the scope of the appended claims, to the precise arrangement and organization of these instrumentalities as herein set forth.

Figure 1 is an elevation, partly broken away, of a strain gauge embodying my invention.

Figure 2 is an end view.

Figure 3 is an elevation of another embodiment of the invention employing a plurality of strain gauges.

Figure 4 is an end view of Figure 3.

Figure 5 is a diagram.

Similar numerals of reference indicate corresponding parts.

Referring to the drawings:

In my prior application Serial No. 414,318, I have shown particularly in Figures 1 and 3 an inductance coil located within a shielding hollow cylinder, the purpose of the cylinder being to provide an electromagnetic shield for the electromagnetic field within the cylinder and created by the inductance coil. The cylinder was divided axially into two parts to allow the coils to yield in an axial direction.

In my present invention, I have shown in Figure 1 a metallic bellows like construction 1 substantially cylindrical having a flattened underside 2 and also having a slot 3 in the bellows running the entire length of the bellows construction. This construction has the following advantages over the divided cylinder construction of my prior application:

It provides a better shield specifically for large elongations since the central part of the coil is not left unshielded.

The construction provides better fastening of the gauge to the specimen since the whole flattened surface can be cemented to the specimen.

The cutout at 4 shows a further constructional detail.

Spacers 5 are located at spaced axial intervals and locate the coil 6 in the center of the shield, thereby providing support for the coil and prevents its sagging if the coil does not have a central core to give this support.

Secondly, these spacers which are fastened to the coil and trapped in the shield will transfer the strain of the shield, caused by elongation of the specimen, to the coil winding. These spacers may be made of mica, ceramics, plastics or any other material having the proper structural characteristics at the temperature for which the gauge is intended.

It will be obvious from the foregoing description that the construction will allow a solid connection between the strained surface and the coil so that the axial length of the coil will correspond to the length of the surface to which the shield 1 is cemented. At the same time, the construction is so elastic in an axial direction that the shield and the coil will follow minutely the longitudinal strain of the specimen surface.

The ends 7 of the coil 6 are electrically fastened to the connection leads 8.

The flattened underside 2 of the shield 1 is axially extended outside of the cylinder and provides two tabs 9 and 10 which are used to connect the shield to a ground wire, not shown.

Two or more gauges may be mechanically fastened together by springs 12 bent into the proper shape, see Figures 3 and 4. The far end connection leads 11 are electrically connected together. This means that the assembly will act as one gauge both mechanically and electrically, having twice the inductance L of one gauge and also twice the incremental inductance $$\frac{\Delta L}{\Delta S}$$

where $\Delta L$ is the small change in inductance for a small change in strain $\Delta S$.

It is obvious, that instead of using the springs 12, we can use one sheet spring 12 bent into the shape shown in Figure 4 and extending the entire length of the multiple gauge having the same corrugations as the shield 1 and fitting into it. The shield 1 can be made of many types of material such as copper, brass, beryllium-copper, platinum, etc. to suit requirements and production technique. They may also be made of rubber or other elastic materials which have been made electrically conducting and shielding by spraying or other methods. If sufficient elasticity is obtained in this way, the corrugations can be dispensed with.

In Figure 5, I have shown a miniature graph showing certain mathematical and electrical relationships and functions.

The ordinate shows strain or the change $\Delta l$ in the axial length of the coil. The line 15 shows the inductance L of the coil as a function of the strain $\Delta l$ as given by the formula $$L = \frac{r^2 \cdot n^2}{\theta r + 10l}$$

where:

L is inductance of coil
r is radius of coil
l is length of coil at any time
n is the number of turns in the coil winding.

The given formula is discussed in my prior application herein identified.

This is not the only formula which can be used. A number of formulas have been used to figure the inductance of a solenoid. They all give substantially the same results.

It will be seen that this formula gives a linear relationship between stress and strain for a substantial amount of strain.

16 is a straight line having the same slope as the curve 15 has for zero strain. It will be seen that at the point 17 the curve 15 parts from the straight line 17. In actual tests, however, the inductance does not follow the line 15 but looks rather like the curve 18. The reason for this discrepancy is very simple. Curve 15 was figured from the assumption that the radius of the coil $r$ in the formula remains constant. This is true for a small amount of strain. For larger amounts of strain this is no longer true. The radius of the coil becomes smaller. The strain reactance relationship can be held substantially linear for a longer strain range to point 19 instead of point 17. The location of point 19 and the exact form of curve 18 can be modified to a great extent by the winding, nature of the core the winding has been laid on, or lack of such a central core to give stress strain gauges of different sensitivity, different size and different linear range.

While I have illustrated the strain gauge coil having a substantially cylindrical form, circular in cross section, I do not intend to limit myself to this form. The coil can be elliptical, square or triangular or any suitable form. I am particularly interested in an elliptical construction with the large axis of the ellipse parallel to the surface of the specimen. This has obvious advantages in the application of the gauge since the axis will be in close relation to the strained surface.

Mathematically, the inductance of such a coil follows the same basic formula.

It is obvious that this strain gauge will work at any temperature, low or high, since the electromagnetic field follows the same basic laws up to any temperature, even those found in the sun and stars.

The basic trouble in making the gauge work at very high temperatures is simply the use of materials which will hold together at the required temperature. Another, is to use cements to fasten the gauge to the specimen surface which will retain their characteristics at the desired temperature.

For very high temperatures, the winding should be made of platinum wire and the shields of the same material or alloys containing this or any other material having similar characteristics.

Having thus described my invention, what I claim as new and desire to secure by Letters Patent is:

1. In a strain gauge, an elongated inductance coil elastic in a linear direction, a tubular shield elastic in a rectilinear direction, within which the coil is contained, extending the full length of the coil and with the coil spaced from the inner wall of the shield, insulating spacers of uniform diameter longitudinally spaced from each other and connected with the outer wall of the coil and the inner wall of the shield to electrically insulate the coil from the shield and mechanically connect them to cause the coil and shield to axially expand or contract together at the same rate when the shield is grounded and attached to the surface of a specimen under test.

2. In a reactance strain gauge, an elastic solenoid coil, an elastic shield concentric to said coil, means to interconnect said coil and shield so that upon extension or compression of said shield the coil will be subjected to the same extension or compression to serve as a measurement of said compression or extension by the change in reactance of said coil and said shield having a flattened side to provide for a large area for attachment to a specimen to be tested.

3. In a reactance strain gauge, an elastic solenoid coil, an elastic corrugated shield concentric to said coil, means to interconnect said coil and shield at spaced intervals along the inner surface of said shield and the outside of said coil to cause the coil to minutely change its length in conformity to the change in length of said shield to cause a linear change in electrical reactance of said coil to measure the change in dimensions of a specimen to which said shield is attached.

References Cited in the file of this patent

UNITED STATES PATENTS

| | | |
|---|---|---|
| 2,115,826 | Norton | May 3, 1938 |
| 2,448,296 | Cary | Aug. 31, 1948 |
| 2,525,587 | Cahn | Oct. 10, 1950 |
| 2,629,013 | Gluyas | Feb. 17, 1953 |
| 2,741,746 | Rankin | Apr. 10, 1956 |